US011582379B2

United States Patent
Matsumoto et al.

(10) Patent No.: US 11,582,379 B2
(45) Date of Patent: Feb. 14, 2023

(54) IMAGE CAPTURING APPARATUS, CONTROL METHOD FOR IMAGE CAPTURING APPARATUS, AND STORAGE MEDIUM

(71) Applicant: CANON KABUSHIKI KAISHA, Tokyo (JP)

(72) Inventors: Satoru Matsumoto, Tokyo (JP); Ryo Maeda, Tokyo (JP); Yasuhiro Kuwabara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/544,080

(22) Filed: Dec. 7, 2021

(65) Prior Publication Data

US 2022/0191384 A1    Jun. 16, 2022

(30) Foreign Application Priority Data

Dec. 16, 2020    (JP) .............................. JP2020-208664

(51) Int. Cl.
*H04N 5/232*    (2006.01)
*G02B 7/28*    (2021.01)
(Continued)

(52) U.S. Cl.
CPC ........... *H04N 5/23212* (2013.01); *G02B 7/28* (2013.01); *G03B 17/18* (2013.01); *H04N 5/2257* (2013.01)

(58) Field of Classification Search
CPC ............. H04N 5/23212; H04N 5/2257; H04N 5/232941; H04N 5/23209; H04N 5/232939; H04N 5/2251; H04N 5/22525; H04N 5/2253; H04N 5/2254; H04N 5/23293; H04N 5/232933; H04N 5/232935;
(Continued)

(56) References Cited

U.S. PATENT DOCUMENTS

2020/0213511 A1    7/2020    Suzuki et al.

FOREIGN PATENT DOCUMENTS

CN    102823258 A  * 12/2012  ............. G03B 17/00
EP    2848974 A1  *  3/2015  ............. G02B 7/282
(Continued)

OTHER PUBLICATIONS

English translation of CN-102823258-A (Year: 2012).*
A British Search Report dated Jul. 13, 2022, that issued in the corresponding British Patent Application No. 2117291.1.

*Primary Examiner* — Shahbaz Nazrul
(74) *Attorney, Agent, or Firm* — Cowan, Liebowitz & Latman, P.C.

(57) ABSTRACT

An image capturing apparatus that allows a photographer to easily recognize whether or not a blurring generated in an image at the time of image capturing is due to a spherical aberration variable mechanism is provided. The image capturing apparatus, to/from which a lens barrel can be attached/detached, comprising a mounting unit configured to mount the lens barrel, a processor; and a memory storing a program which, when executed by the processor, causes the image capturing apparatus to obtain an adjustment amount of spherical aberration from the lens barrel mounted on the mounting unit, and control a display device to display information about the adjustment amount together with an image obtained through the lens barrel.

12 Claims, 10 Drawing Sheets

(51) Int. Cl.
*G03B 17/18* (2021.01)
*H04N 5/225* (2006.01)
(58) Field of Classification Search
CPC ...... H04N 5/232945; G02B 7/28; G02B 7/08;
G02B 7/10; G02B 13/20; G02B 7/102;
G03B 17/18; G03B 17/14; G03B 17/20;
G03B 2206/00
See application file for complete search history.

(56) References Cited

FOREIGN PATENT DOCUMENTS

| | | | |
|---|---|---|---|
| JP | 2003-029317 | A | 1/2003 |
| JP | 2013-092583 | A | 5/2013 |
| JP | 2019-168555 | A | 10/2019 |

\* cited by examiner

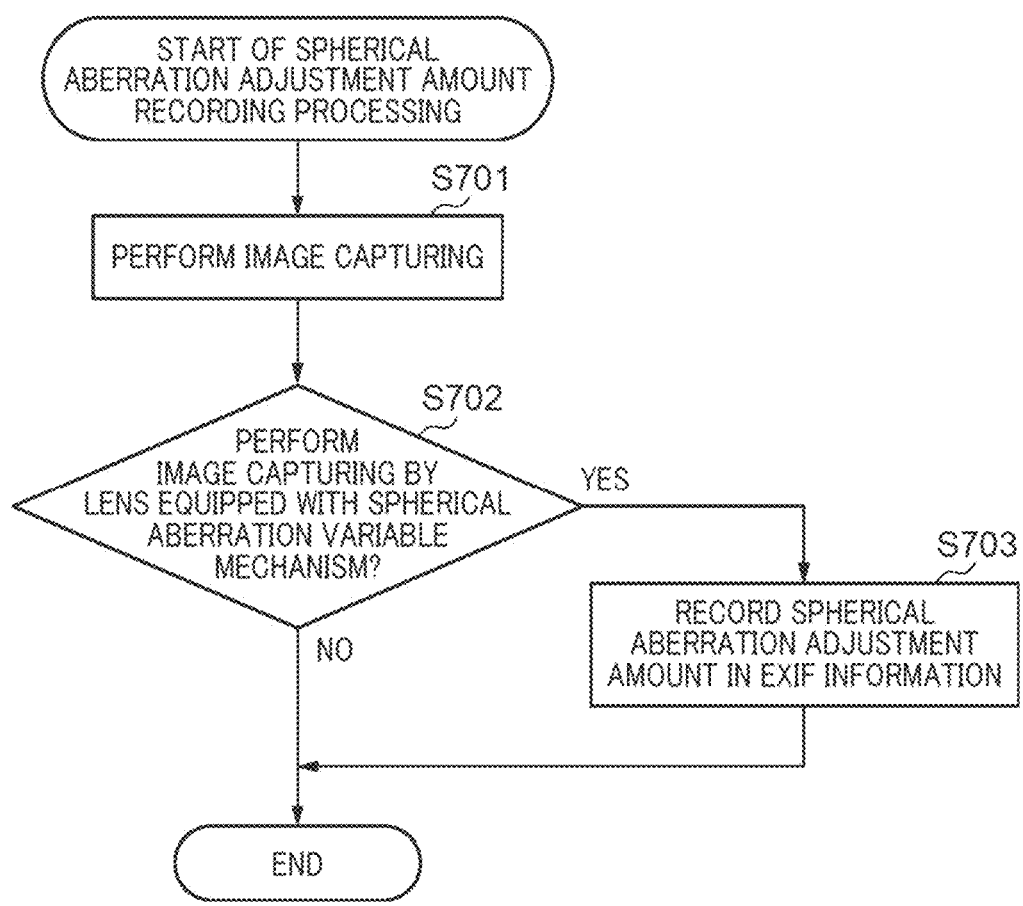

IMAGE CAPTURING APPARATUS, CONTROL METHOD FOR IMAGE CAPTURING APPARATUS, AND STORAGE MEDIUM

BACKGROUND OF THE INVENTION

Field of the Invention

The present invention relates to an image capturing apparatus, a control method for the image capturing apparatus, and a storage medium, and more particularly to a technique for displaying information about a lens barrel.

Description of the Related Art

When performing image capturing by an image capturing apparatus such as a digital camera, in general, since a photographer focuses on a determined subject with high accuracy before performing the image capturing, it would be convenient if the photographer could know the degree of the accuracy, with which the subject is in focus. Therefore, Japanese Laid-Open Patent Publication (kokai) No. 2019-168555 has disclosed an image capturing apparatus, which has a display control device and displays a relationship between a lens position of a focus lens and a subject in-focus position in order to focus on a desired subject. According to the image capturing apparatus described in Japanese Laid-Open Patent Publication (kokai) No. 2019-168555, it becomes possible to easily grasp how to adjust the lens position of the focus lens in order to focus on the desired subject.

There are a wide variety of lens barrels that can be attached to and detached from the image capturing apparatus, and one of them, which is equipped with a spherical aberration variable mechanism and is capable of adjusting a blurring level (a blurring feeling) of a captured image by operating a predetermined operating member, is known. When performing image capturing by using an image capturing apparatus, to which the lens barrel equipped with the spherical aberration variable mechanism is attached, if the photographer unconsciously touches the predetermined operating member, the blurring level that the photographer does not intend may be set. In this case, on a display of the image capturing apparatus described in Japanese Laid-Open Patent Publication (kokai) No. 2019-168555, the photographer does not know whether the cause of the blurring is due to the spherical aberration variable mechanism or other than the spherical aberration variable mechanism (for example, out-of-focus, a malfunction of the lens barrel, or the like).

SUMMARY OF THE INVENTION

The present invention provides an image capturing apparatus that allows a photographer to easily recognize whether or not a blurring generated in an image at the time of image capturing is due to a spherical aberration variable mechanism, a control method for the image capturing apparatus, and a storage medium.

Accordingly, the present invention provides an image capturing apparatus, to/from which a lens barrel can be attached/detached, comprising a mounting unit configured to mount the lens barrel, a processor, and a memory storing a program which, when executed by the processor, causes the image capturing apparatus to obtain an adjustment amount of spherical aberration from the lens barrel mounted on the mounting unit, and control so as to display information about the adjustment amount on a display device together with an image obtained through the lens barrel.

According to the image capturing apparatus according to the present invention, it is possible for the photographer to easily recognize whether or not the blurring generated in the image at the time of image capturing is due to the spherical aberration variable mechanism.

Further features of the present invention will become apparent from the following description of embodiments with reference to the attached drawings.

BRIEF DESCRIPTION OF THE DRAWINGS

FIG. 7 is a flowchart of a spherical aberration adjustment amount recording processing.

DESCRIPTION OF THE EMBODIMENTS

The present invention will now be described in detail below with reference to the accompanying drawings showing embodiments thereof.

An image capturing apparatus according to the present invention will be described.

Figure 1A:
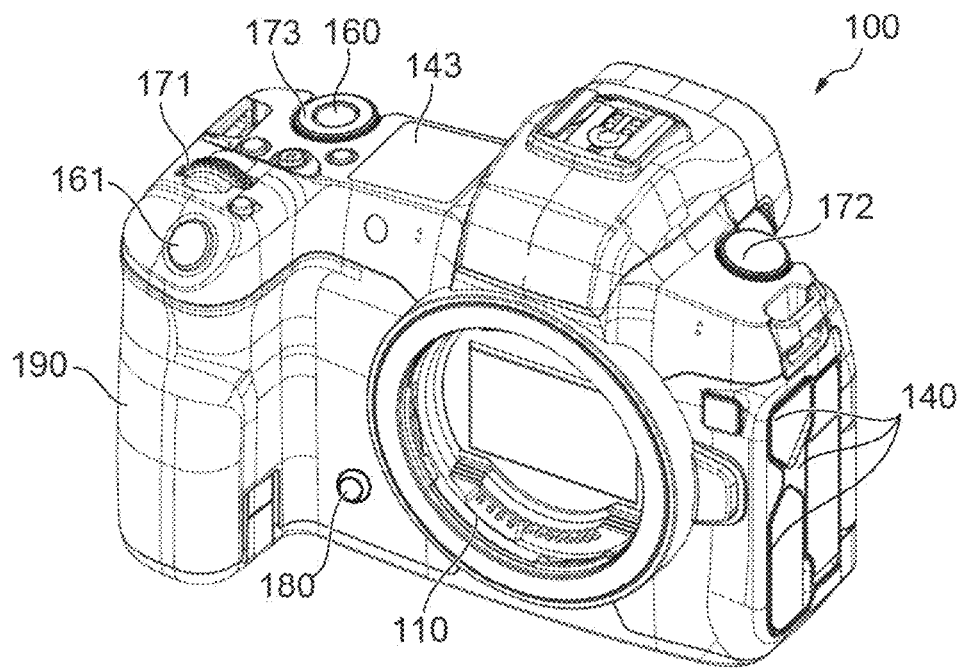
FIGS. 1A and 1B are perspective views that show the appearance of an image capturing apparatus according to an embodiment of the present invention.
Figure 1B:
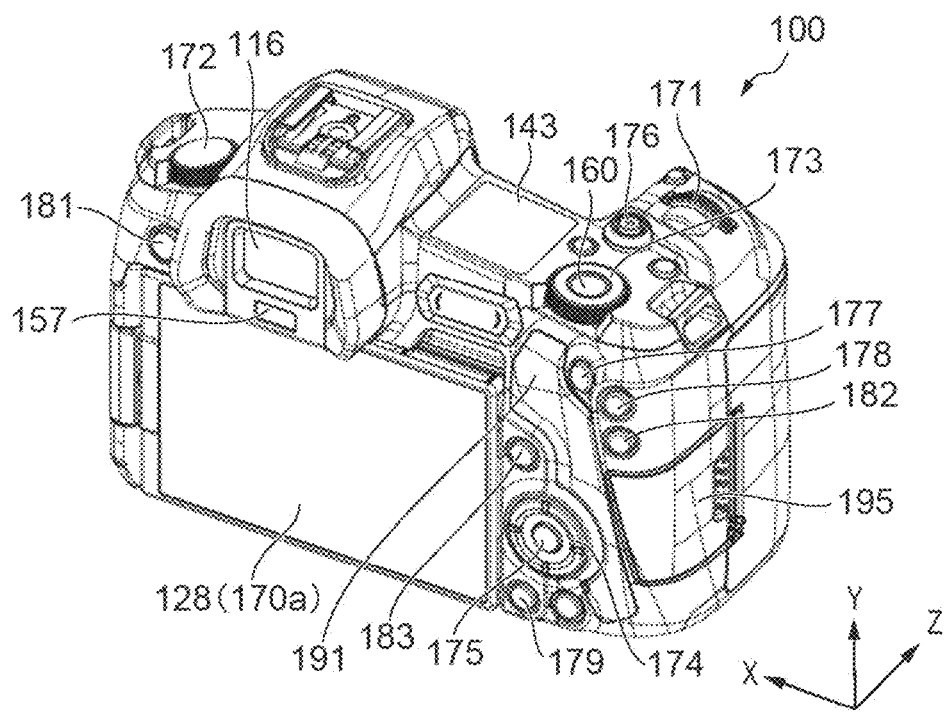

FIG. 1A is a front perspective view that shows the appearance of an image capturing apparatus 100 according to an embodiment of the present invention. Further, FIG. 1B is a rear perspective view of the image capturing apparatus 100. Specifically, the image capturing apparatus 100 is a so-called mirrorless single-lens reflex camera (i.e., Mirrorless Interchangeable Lens Camera). However, the image capturing apparatus according to the present invention is not limited to the mirrorless single-lens reflex camera, and the present invention can be applied to all image capturing apparatuses, to which a lens barrel equipped with a spherical aberration variable mechanism can be attached.

The image capturing apparatus 100 has a display unit 128, a terminal cover 140, an extra-finder display unit 143, a shutter button 161, a touch panel 170a, a main electronic dial 171, a power switch 172, a sub electronic dial 173, a four-direction key 174, and a SET button 175. Further, the image capturing apparatus 100 has a moving image button 176, an AE (Automatic Exposure) lock button 177, an enlargement button 178, a reproduction button 179, a menu button 181, and a touch bar 182. Furthermore, the image capturing apparatus 100 has a communication terminal 110, an ocular portion (i.e., an eyepiece portion) 116, an ocular detecting unit (i.e., an eyepiece detecting unit) 157, a grip portion 190, a thumb rest portion 191, and a lid 195.

The display unit 128 is provided on a back surface of the image capturing apparatus 100, and is configured by a display device such as a color liquid crystal display that displays images and various kinds of information. Various kinds of information such as a menu screen for performing various settings related to image capturing and reproduction by the image capturing apparatus 100, a live view image, and a reproduced image are displayed on the display unit 128. The touch panel 170a is superimposed on the display unit 128, and detects a touch operation on a display surface (a touch operation surface) of the display unit 128. The extra-finder display unit 143 is a display device provided on an upper surface of the image capturing apparatus 100, and displays various setting values of the image capturing apparatus 100 such as a shutter speed and an aperture, which are set at the time of image capturing.

The shutter button 161 is an operating member for giving an image capturing instruction. A mode switching switch 160 is an operating member for switching photographing modes. The terminal cover 140 is a member that protects a connector (not shown), to which a connection cable or the like for connecting the image capturing apparatus 100 to an external apparatus is connected. The main electronic dial 171 is a rotation operating member for performing the change of the setting values such as the shutter speed and the aperture, and the like by a rotation operation. The power switch 172 is an operating member that switches between a power ON state and a power OFF state of the image capturing apparatus 100. The sub electronic dial 173 is a rotation operating member for performing moving a selection frame (a cursor), forwarding an image, and the like by a rotation operation. The four-direction key 174 is an operating member configured so that each of an upper part, a lower part, a left part, and a right part associated with a predetermined processing can be pushed in. The SET button 175 is a push button type operating member that is mainly used for determining a selected item, and the like.

The moving image button 176 is a push button type operating member that is used for instructing the start and stop of moving image photographing (moving image recording). The AE lock button 177 is an operating member that enables an exposure state to be fixed by being pressed in a photographing standby state. The enlargement button 178 is an operation button for switching between an ON state and an OFF state of an enlargement mode that can be executed when performing a live view display (a LV display) of the photographing mode. By operating the main electronic dial 171 after turning on the enlargement mode (i.e., switching to the ON state of the enlargement mode), it is possible to perform enlarging or reducing the live view image (a LV image). Further, by operating the enlargement button 178 in a reproduction mode, it is possible to perform enlarging the reproduced image, and changing an enlargement ratio of the reproduced image.

The reproduction button 179 is an operating member for switching between the photographing mode and the reproduction mode. When the reproduction button 179 is pressed during the photographing mode, it is possible to shift from the photographing mode to the reproduction mode, and display the latest image among images recorded on a recording medium 295 (described later) on the display unit 128. The menu button 181 is an operating member for displaying the menu screen, which performs the various settings, on the display unit 128. A photographer (a user) can intuitively perform the various settings by using the menu screen displayed on the display unit 128, and the four-direction key 174 and the SET button 175.

The touch bar 182 (a multi-function bar, that is, a M-Fn bar) is a line-shaped touch operating member (i.e., a line touch sensor) that is capable of accepting the touch operation. The touch bar 182 is disposed at a position that the thumb of the right hand can perform the touch operation while the grip portion 190 is held by the right hand (the little finger, the ring finger, and the middle finger) so that the shutter button 161 can be pressed by the index finger of the right hand. That is, the touch bar 182 is disposed at a position that it can be operated while the image capturing apparatus 100 is held (in a photographing attitude) so that the photographer can look into a finder by bringing his/her eye in contact with the eyepiece portion 116, and press the shutter button 161 at any time. The touch bar 182 is also an operating member that is capable of accepting a tapping operation (i.e., an operation of touching without moving within a predetermined period of time and then releasing), a sliding operation to slide toward left or right (i.e., an operation of moving a touch position while touching), and the like. Moreover, the touch bar 182 is an operating member different from the touch panel 170a, and does not have a display function.

The communication terminal 110 is a member, by which a system control unit 250 of the image capturing apparatus 100 communicates with a lens system control circuit 204 (see FIG. 2) of a lens barrel 200. The eyepiece portion 116 is a portion that the photographer brings his/her eye close to or separate from the looking-into-type eyepiece finder. The photographer can visually recognize the image displayed on an internal EVF (Electronic View Finder) 229 (see FIG. 2) through the eyepiece portion 116. The eyepiece detecting unit 157 is a sensor that detects whether or not the photographer brings his/her eye in contact with the eyepiece portion 116. The lid 195 is a member that protects a slot portion provided with a slot for housing the recording medium 295 (see FIG. 2), and is provided so as to be openable and closable with respect to the slot portion. The grip portion 190 is a holding portion that is designed to be easily gripped by the right hand when the photographer holds the image capturing apparatus 100 for performing the image capturing. The shutter button 161 and the main electronic dial 171 are disposed at positions that can be operated by the index finger of the right hand while holding the image capturing apparatus 100 by holding the grip portion 190 with the little finger, the ring finger, and the middle finger of the right hand. Further, the sub electronic dial 173 and the touch bar 182 are disposed at positions that can be operated by the thumb of the right hand while holding the image capturing apparatus 100 by holding the grip portion 190 with the little finger, the ring finger, and the middle finger of the right hand. The thumb rest portion 191 (a thumb standby position) is a grip member that is provided on the back surface side of the image capturing apparatus 100 at a position where the thumb of the right hand holding the grip portion 190 can be easily placed without operating any operating member. The thumb rest portion 191 is configured by a rubber member or the like in order to enhance a holding force (a grip feeling).

Figure 2:
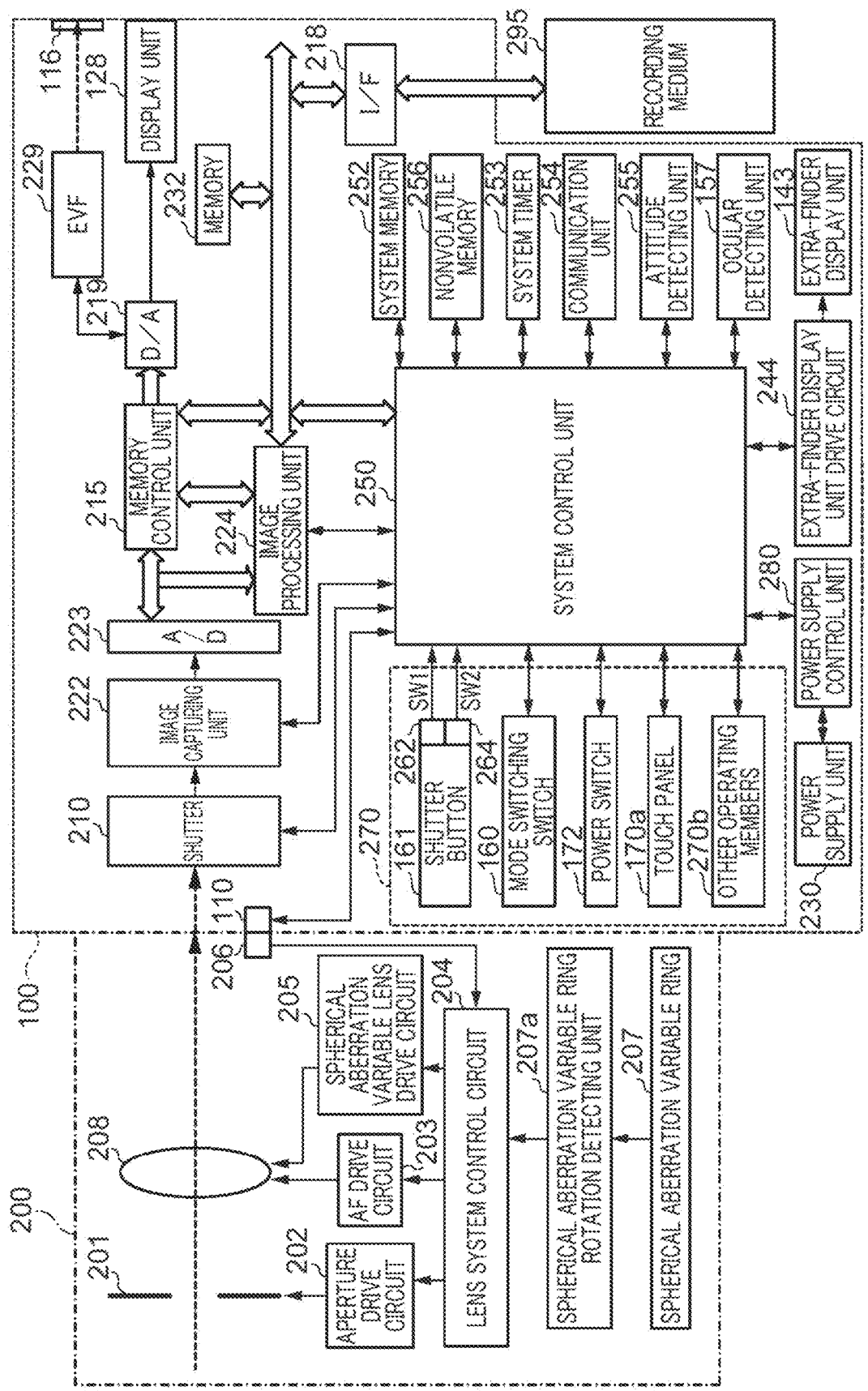
FIG. 2 is a block diagram that shows a schematic configuration of the image capturing apparatus and a lens barrel.

A block configuration of the image capturing apparatus 100 will be described. FIG. 2 is a block diagram that shows a schematic configuration of the image capturing apparatus 100 and the lens barrel 200. Further, among configuration elements of the image capturing apparatus 100 shown in FIG. 2, those described with reference numerals in FIGS. 1A and 1B are designated by the same reference numerals, and duplicate descriptions will be omitted. The lens barrel 200 is an image capturing lens unit that can be attached to and detached from the image capturing apparatus 100. The lens barrel 200 has an aperture 201, an aperture drive circuit 202, an AF drive circuit 203, the lens system control circuit 204, a spherical aberration variable lens drive circuit 205, a communication terminal 206, a spherical aberration variable ring 207, a spherical aberration variable ring rotation detecting unit 207a, and a lens group 208.

Although the lens group 208 is usually configured by a plurality of lenses, FIG. 2 shows only one lens for simplification. The communication terminal 206 enables communications between the lens system control circuit 204 and the system control unit 250 by contacting the communication terminal 110 of the image capturing apparatus 100 in a state that the lens barrel 200 is attached to the image capturing apparatus 100. The aperture 201 adjusts the amount of light incident on the lens group 208. The aperture drive circuit 202 drives the aperture 201.

The lens system control circuit 204 performs the control of the aperture 201 via the aperture drive circuit 202. Further, the lens system control circuit 204 brings into focus by displacing the position of the lens group 208 via the AF drive circuit 203. The spherical aberration variable ring 207 is a rotation operating member (a spherical aberration variable member) for driving the plurality of lenses constituting the lens group 208 to change (adjust) a spherical aberration amount. The spherical aberration variable ring rotation detecting unit 207a detects the presence or absence of a rotation operation, a rotation direction, and a rotation amount (a rotation angle) of the spherical aberration variable ring 207. The lens system control circuit 204 drives the lens group 208 via the spherical aberration variable lens drive circuit 205 based on a detection result obtained by the spherical aberration variable ring rotation detecting unit 207a, so as to change a positional relationship among the plurality of lenses constituting the lens group 208. As a result, the spherical aberration amount is changed, and it is possible to change a blurring level of the captured image. Moreover, the details of how the blurring level changes will be described later.

In addition to respective configuration elements that are shown in FIGS. 1A and 1B, the image capturing apparatus 100 has a shutter 210, a D/A (Digital to Analog) converter 219, an image capturing unit 222, an A/D (Analog to Digital) converter 223, the EVF 229, a memory 232, the system control unit 250, a system memory 252, and a nonvolatile memory 256. Further, the image capturing apparatus 100 has a system timer 253, a communication unit 254, an attitude detecting unit 255, an extra-finder display unit drive circuit 244, a power supply control unit 280, a power supply unit 230, a recording medium I/F (interface) 218, and an operating unit 270.

The shutter 210 is a focal plane shutter that controls an exposure time to the image capturing unit 222, and the operation of the shutter 210 is controlled by the system control unit 250. The image capturing unit 222 is an image pickup device (an image sensor) such as a CCD (Charge Coupled Device) sensor or a CMOS (Complementary Metal Oxide Semiconductor) sensor that converts an optical image, which is formed by the lens barrel 200, into image signals (electrical signals). Further, the image capturing unit 222 may have an image sensing plane phase difference sensor that outputs defocus amount information to the system control unit 250. The A/D converter 223 converts analog signals, which are outputted from the image capturing unit 222, into digital signals.

An image processing unit 224 performs predetermined processing (for example, a pixel interpolation processing, a resizing processing such as reduction, a color conversion processing, etc.) with respect to data from the A/D converter 223 or data from a memory control unit 215. Further, the image processing unit 224 performs a predetermined calculation processing by using image data obtained by image capturing, and the system control unit 250 performs an exposure control and a distance measurement control by using the calculation result. As a result, a TTL (through-the-lens) method AF (autofocus) processing, an AE (autoexposure) processing, an EF (flash pre-flash) processing, and the like are performed. Furthermore, the image processing unit 224 performs a predetermined calculation processing by using the image data obtained by the image capturing, and performs a TTL method AWB (auto white balance) processing based on the obtained calculation result.

Output data from the A/D converter 223 is written into the memory 232 via the image processing unit 224 and the memory control unit 215. Alternatively, the output data from the A/D converter 223 is written into the memory 232 via the memory control unit 215 without going through the image processing unit 224. The memory 232, which functions as a predetermined storage unit, stores image data that is obtained by the image capturing unit 222 and is converted into digital data by the A/D converter 223, and image data to be displayed on the display unit 128 and the EVF 229. The memory 232 has a storage capacity sufficient to store data of a predetermined number of still images, data of moving images for a predetermined time, and audio data.

Further, the memory 232 is also used as a video memory that stores data for image display. The D/A converter 219 converts the data for image display, which is stored in the memory 232, into analog signals and then supplies it to the display unit 128 and the EVF 229. In this way, the image data for display, which is written into the memory 232, is displayed on the display unit 128 and the EVF 229 via the D/A converter 219. The display unit 128 and the EVF 229 are display devices such as an LCD (Liquid Crystal Display) and an organic EL (Electro-Luminescence) display, respectively, and perform a display corresponding to the analog signals from the D/A converter 219. It is possible to perform the live view display (the LV display) by converting the digital signals, which are obtained by an A/D conversion performed by the A/D converter 223 and are stored in the memory 232, into the analog signals by the D/A converter 219, and sequentially transferring the analog signals to the display unit 128 or the EVF 229 for display.

The system control unit 250 is a control unit that has at least one processor and/or at least one circuit, controls the entire image capturing apparatus 100, and also controls the operation of the lens barrel 200 in accordance with the operation of the image capturing apparatus 100. The system control unit 250 realizes various kinds of processing described later by executing programs stored in the nonvolatile memory 256. Further, the system control unit 250 performs a display control by controlling the memory 232, the D/A converter 219, the display unit 128, the EVF 229, and the like.

For example, the system memory 252 is a RAM (Random Access Memory). The system control unit 250 expands constants and variables for the operation of the system control unit 250, the program that is read out from the nonvolatile memory 256, etc. on the system memory 252. The nonvolatile memory 256 is a memory that can be electrically erased and recorded, and is, for example, an EEPROM (Electrically Erasable Programmable Read Only Memory) or the like. The constants, programs, etc. for the operation of the system control unit 250 are stored in the nonvolatile memory 256. The "programs" here refer to programs for executing various kinds of processing performed according to flowcharts, which will be described later.

The system timer 253 is a time measuring unit that measures the time used for various controls and the time of a built-in clock. The communication unit 254 transmits and receives video signals and audio signals to and from the external apparatus that is connected by a wireless or wired cable. The communication unit 254 can be connected to a wireless LAN (Local Area Network) or the Internet. In addition, the communication unit 254 can also communicate with the external apparatus by using a short-range wireless communication standard such as Bluetooth (registered trademark) or Bluetooth Low Energy. The communication unit 254 can transmit the image (including the LV image) captured by the image capturing unit 222 and the image recorded on the recording medium 295 to the external apparatus, and conversely, the communication unit 254 can receive the image data and other various kinds of information from the external apparatus.

The attitude detecting unit 255 is configured by an acceleration sensor, a gyro sensor, or the like that detects the attitude of the image capturing apparatus 100 with respect to the direction of gravity. By using the acceleration sensor or the gyro sensor, it is also possible to detect the movement of the image capturing apparatus 100 (pan, tilt, lift, whether or not it is stationary, etc.). Based on the attitude detected by the attitude detecting unit 255, it is possible to judge whether the image photographed by the image capturing unit 222 is an image photographed by holding the image capturing apparatus 100 horizontally or an image photographed by holding the image capturing apparatus 100 vertically. The system control unit 250 can add orientation information corresponding to the attitude detected by the attitude detecting unit 255 to an image file of the image captured by the image capturing unit 222, and further, the system control unit 250 can rotate the image according to the detected orientation and record it. The eyepiece detecting unit 157 is a sensor that detects approaching and separating (eye-contacting and eye-separation) of an eye or an object with respect to the eyepiece portion 116 of the eyepiece finder incorporating the EVF 229. The system control unit 250 switches display/non-display (a display state/a non-display state) of the display unit 128 and the EVF 229 according to the state detected by the eyepiece detecting unit 157. For example, in the case that it is in the image capturing standby state and switching setting of the display destination is an automatic switching, during non-eye-contacting, the display unit 128 becomes in the display state, and the EVF 229 becomes in the non-display state. On the other hand, during eye-contacting, the EVF 229 becomes in the display state, and the display unit 128 becomes in the non-display state.

As the eyepiece detecting unit 157, for example, an infrared proximity sensor can be used. In this case, when an object approaches the eyepiece portion 116, infrared rays projected from a light source of the infrared proximity sensor are reflected by the object, and are received by a light receiving unit of the infrared proximity sensor. It is possible to judge how close the object is from the eyepiece portion 116 (an eyepiece distance) based on the amount of the infrared rays received at this time. In this way, the eyepiece detecting unit 157 can also detect a proximity distance of the object to the eyepiece portion 116.

The system control unit 250 judges that an eye-contacting state (an approaching state) has been reached when an object approaching the eyepiece portion 116 within a predetermined distance is detected from a non-eye-contacting state (a non-approaching state). On the other hand, the system control unit 250 judges that the eye has been separated when the object that has detected the approach is separated by the predetermined distance or more from the eye-contacting state (the approaching state). A threshold value for detecting the eye-contacting and a threshold value for detecting the eye-separation may be the same value, or may be different values by providing, for example, a hysteresis. Moreover, after detecting the eye-contacting, the system control unit 250 judges that it is in the eye-contacting state until the eye-separation is detected, and conversely, after detecting the eye-separation, the system control unit 250 judges that it is in the non-eye-contacting state until the eye-contacting is detected. The infrared proximity sensor is one example of sensors that can be used as the eyepiece detecting unit 157, and any sensor, which can detect a state that can be regarded as the eye-contacting/the eye-separation, can be used.

The various setting values of the image capturing apparatus 100 such as the shutter speed and the aperture, are displayed on the extra-finder display unit 143 via the extra-finder display unit drive circuit 244. The power supply control unit 280 is configured by a battery detecting circuit, a DC-DC converter, a switch circuit for switching between blocks to be energized, and the like, and detects whether or not a battery is installed, the type of the battery, the remaining battery level, and the like. Further, the power supply control unit 280 controls the DC-DC converter based on its own detection result and the instruction from the system control unit 250, and supplies a necessary voltage to each unit including the recording medium 295 for a necessary period. The power supply unit 230 is a primary battery such as an alkaline battery or a lithium battery, a secondary battery such as a NiCd battery, a NiMH battery, or a Li battery, an AC adapter, or the like.

The recording medium I/F 218 is an interface that enables communications (data transmission and reception) between the recording medium 295 such as a memory card or a hard disk and the system control unit 250. The recording medium 295 is a recording medium such as the memory card, on which the photographed images, etc. are recorded, and is configured by a semiconductor memory, a magnetic disk, or the like.

The operating unit 270 is an input unit that receives operations by the photographer (photographer operations), and is used to input various operation instructions to the system control unit 250. The operating unit 270 has the shutter button 161, the mode switching switch 160, the power switch 172, the touch panel 170a, other operating members 270b, and the like. The other operating members 270b include the main electronic dial 171, the sub electronic dial 173, the four-direction key 174, and the SET button 175. Further, the other operating members 270b include the moving image button 176, the AE lock button 177, the enlargement button 178, the reproduction button 179, the menu button 181, and the touch bar 182.

The shutter button 161 has a first shutter switch 262 and a second shutter switch 264. The first shutter switch 262 is turned on in the middle of operating the shutter button 161 (by a so-called half-pressing (i.e., a photographing preparation instruction)) to generate a first shutter switch signal SW1. Upon receiving the first shutter switch signal SW1, the system control unit 250 starts photographing preparation operations such as the AF processing, the AE processing, the AWB processing, the EF processing, etc. The second shutter switch 264 is turned on when the operation of the shutter button 161 is completed (by a so-called full-pressing (i.e., a photographing instruction)) to generate a second shutter switch signal SW2. When the system control unit 250 receives the second shutter switch signal SW2, the system control unit 250 performs operations of a series of image capturing processing from reading out signals from the image capturing unit 222 to writing the captured image as an image file into the recording medium 295.

The mode switching switch 160 switches the operation mode of the system control unit 250 to any one of a still image photographing mode, a moving image photographing mode, the reproduction mode, etc. As modes included in the still image photographing mode, there are an auto photographing mode, an auto scene discrimination mode, a manual mode, an aperture priority mode (an Av mode), a shutter speed priority mode (a Tv mode), and a program AE mode (a P mode). Further, the still image photographing mode includes various scene modes, various custom modes, and the like, which become photographing settings for each photographing scene. The photographer can switch to any one of these modes by operating the mode switching switch 160. Moreover, such a configuration, in which after switching to a photographing mode list screen by the mode switching switch 160 once, selectively switch to any one of the displayed plurality of modes by using another operating member, may be adopted. Similarly, the moving image photographing mode may include a plurality of modes.

The touch panel 170a is a touch sensor that detects various kinds of touch operations on the display surface (an operation surface of the touch panel 170a) of the display unit 128. The touch panel 170a is configured so that light transmittance of a light does not interfere with the display of the display unit 128, and is attached to an upper layer of the display surface of the display unit 128. As a result, the touch panel 170a and the display unit 128 are formed as an integral structure. By associating input coordinates on the touch panel 170a with display coordinates on the display surface of the display unit 128, a GUI (a graphical user interface, i.e., a graphical photographer interface) as if a screen displayed on the display unit 128 can be directly operated, is provided to the photographer.

Figure 3:
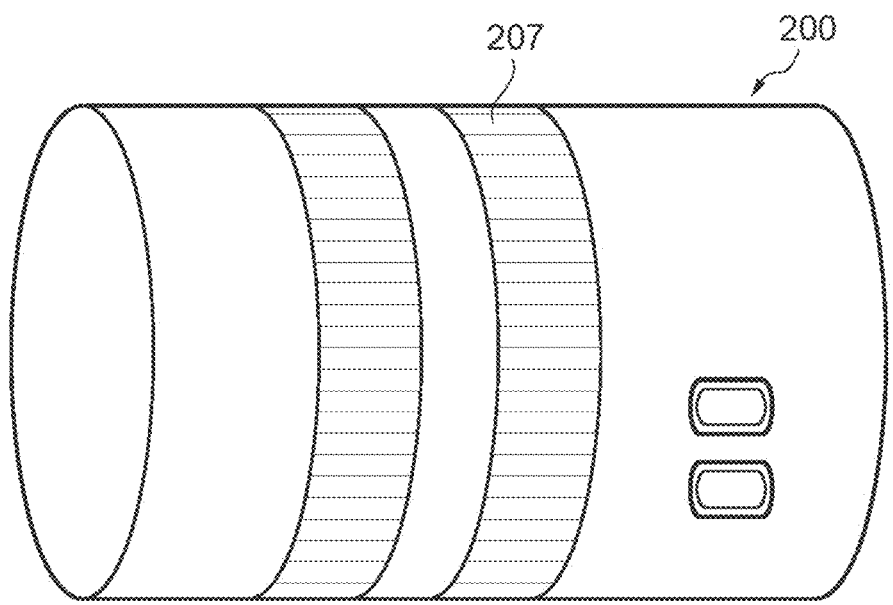
FIG. 3 is a perspective view that shows the appearance of the lens barrel.

FIG. 3 is a perspective view that shows the appearance of the lens barrel 200. The spherical aberration variable ring 207 is provided so as to be capable of rotating around an optical axis at a predetermined position in the optical axis direction, and so as to make one round around an outer circumference of the lens barrel 200. By performing the rotation operation of the spherical aberration variable ring 207, it is possible for the photographer to change a spherical aberration adjustment amount by the spherical aberration variable mechanism.

Moreover, although not shown, the spherical aberration variable ring 207 is provided with a marker such as a printed line or an irregularity. Further, on the outer circumference of the lens barrel 200, a range, in which the spherical aberration can be changed, is formed, for example, is printed on a portion facing the marker in the optical axis direction, that is, an index and a value that indicate the value of a settable spherical aberration adjustment amount, are formed, for example, are printed on the portion facing the marker in the optical axis direction. The spherical aberration adjustment amount is a dimensionless value, and can be set at a predetermined step (for example, 0.5 step) or arbitrarily in a range of, for example, −4.0 to +4.0. In a default state (a state that the spherical aberration is not adjusted), the spherical aberration adjustment amount is '0 (zero)', and the spherical aberration variable ring 207 is at a position where the marker points to the index '0'. The spherical aberration adjustment amount can be changed by rotating the spherical aberration variable ring 207 to match the marker with a desired value provided on the index.

Figure 4:
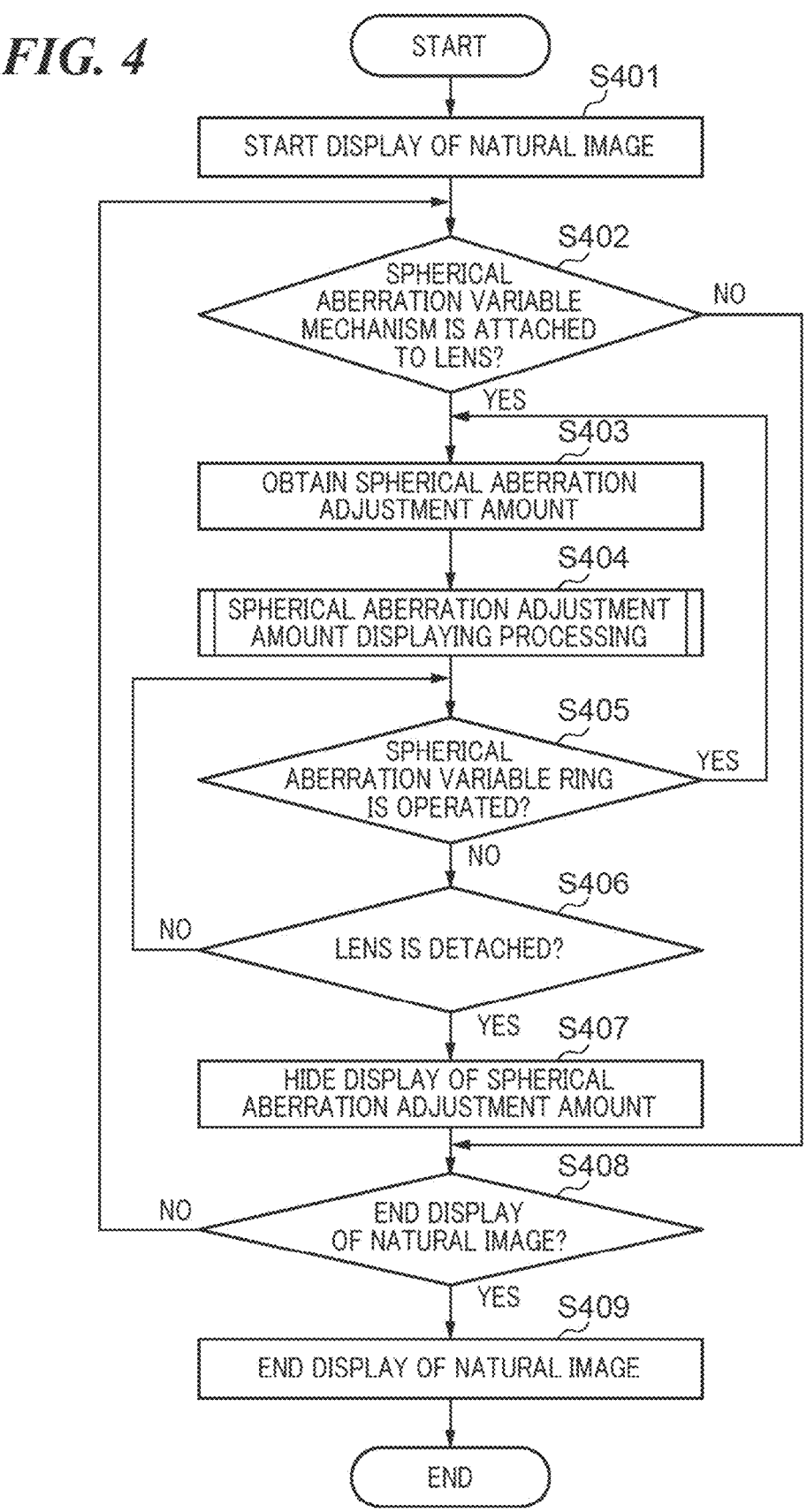
FIG. 4 is a flowchart of a processing for displaying a spherical aberration adjustment amount on a display unit.

A spherical aberration adjustment amount displaying processing will be described. FIG. 4 is a flowchart of a processing for displaying the spherical aberration adjustment amount, which is set (changed) by the spherical aberration variable mechanism, on the display unit 128. Each processing (step), which is indicated by a S number in the flowchart of FIG. 4, is realized by the system control unit 250 expanding the program, which is stored in the nonvolatile memory 256, on the system memory 252 and executing the program.

When the image capturing (obtaining a subject image) is started in a step S401, the system control unit 250 starts the display of a natural image on the display unit 128. The natural image refers to an LV image obtained under an image capturing condition that is set by the image capturing apparatus 100 and the lens barrel 200 at that time. Next, in a step S402, the system control unit 250 obtains lens information about the lens barrel 200, which is mounted on the image capturing apparatus 100, from the lens system control circuit 204, and then, judges whether or not the lens barrel 200 is equipped with the spherical aberration variable mechanism based on the said lens information. In the case that the system control unit 250 judges that the lens barrel 200 is not equipped with the spherical aberration variable mechanism (NO in the step S402), the system control unit 250 advances the processing to a step S408 without displaying information about the spherical aberration variable mechanism, and on the other hand, in the case that the system control unit 250 judges that the lens barrel 200 is equipped with the spherical aberration variable mechanism (YES in the step S402), the system control unit 250 advances the processing to a step S403.

In the step S403, the system control unit 250 obtains the spherical aberration adjustment amount, which is set in the lens barrel 200, from the lens system control circuit 204. Next, in a step S404, the system control unit 250 performs a display control processing so that the spherical aberration adjustment amount is displayed on the display unit 128. Moreover, the details of the processing of the step S404 will be described later. In a step S405, the system control unit 250 judges whether or not the spherical aberration variable ring 207 has been operated. The system control unit 250 performs judging of the step S405 based on a signal indicating a detection result of the spherical aberration variable ring rotation detecting unit 207a, which is obtained from the lens system control circuit 204. In the case that the system control unit 250 judges that the spherical aberration variable ring 207 has been operated (YES in the step S405), the system control unit 250 returns the processing to the step S403, and on the other hand, in the case that the system control unit 250 judges that the spherical aberration variable ring 207 has not been operated (NO in the step S405), the system control unit 250 advances the processing to a step S406.

In the step S406, the system control unit 250 judges whether or not the lens barrel 200 is detached from the image capturing apparatus 100. The lens barrel 200 to be detached here is inevitably equipped with the spherical aberration variable mechanism. In the case that the system control unit 250 judges that the lens barrel 200 is not detached (NO in the step S406), the system control unit 250 returns the processing to the step S403, and on the other hand, in the case that the system control unit 250 judges that the lens barrel 200 is detached (YES in the step S406), the system control unit 250 advances the processing to a step S407. In the step S407, the system control unit 250 hides the display of the spherical aberration adjustment amount displayed on the display unit 128.

In the step S408, the system control unit 250 judges whether or not to end the display of the natural image. For example, in the case that the system control unit 250 detects that the image capturing apparatus 100 has changed from the photographing mode to the reproduction mode, the system control unit 250 ends the display of the natural image. In the case that the system control unit 250 judges that the display of the natural image is to be continued (NO in the step S408), the system control unit 250 returns the processing to the step S402, and on the other hand, in the case that the system control unit 250 judges to end the display of the natural image (YES in the step S408), the system control unit 250 advances the processing to a step S409. In the step S409, the system control unit 250 ends the display of the natural image displayed on the display unit 128, and thereby, ends the processing of FIG. 4.

Figure 5:
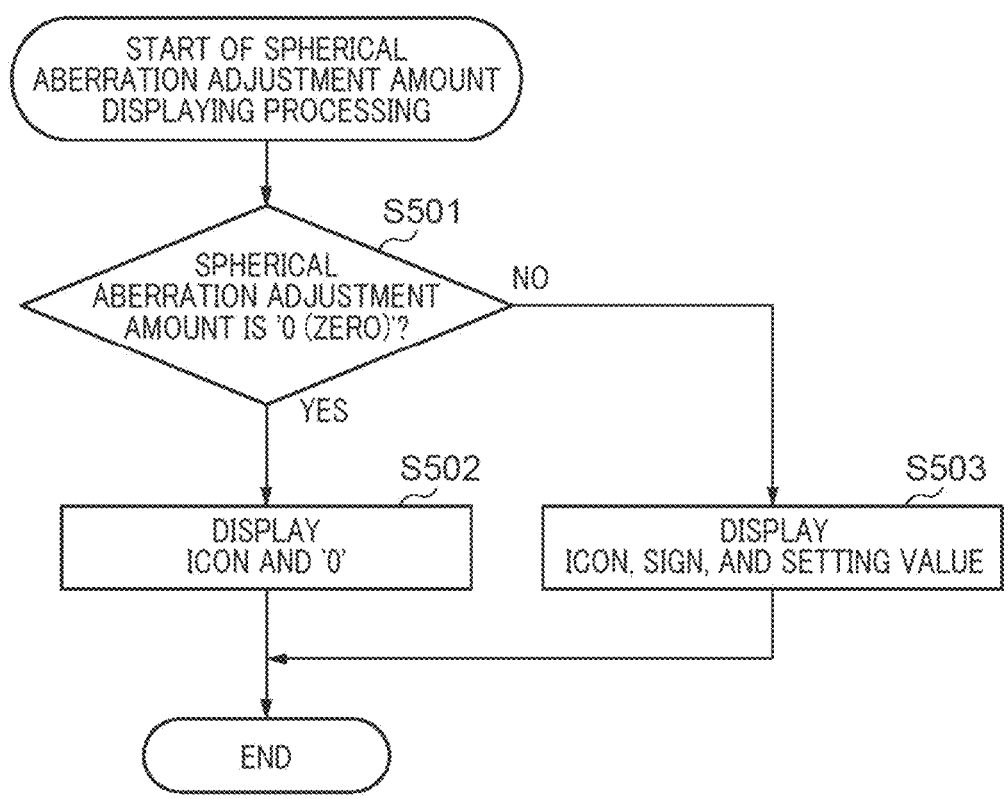
FIG. 5 is a flowchart of a spherical aberration adjustment amount displaying processing of a step S404.

Next, the spherical aberration adjustment amount displaying processing of the step S404 will be described in detail. FIG. 5 is a flowchart of the spherical aberration adjustment amount displaying processing of the step S404. Each processing (step), which is indicated by the S number in the flowchart of FIG. 5, is realized by the system control unit 250 expanding the program, which is stored in the nonvolatile memory 256, on the system memory 252 and executing the program.

In a step S501, the system control unit 250 judges whether or not a setting value of the spherical aberration adjustment amount is '0 (zero)'. That is, it is judged whether or not to be in a state that the spherical aberration variable mechanism is not operated. In the case that the system control unit 250 judges that the setting value of the spherical aberration adjustment amount is '0' (YES in the step S501), the system control unit 250 advances the processing to a step S502, and on the other hand, in the case that the system control unit 250 judges that the setting value of the spherical aberration adjustment amount is not '0' (NO in the step S501), the system control unit 250 advances the processing to a step S503. In the step S502, the system control unit 250 displays an icon, which indicates that it is the spherical aberration adjustment amount set by the spherical aberration variable mechanism, and '0' on the display unit 128, and thereby, ends the spherical aberration adjustment amount displaying processing of the step S404. On the other hand, in the step S503, the system control unit 250 displays the icon, which indicates that it is the spherical aberration adjustment amount set by the spherical aberration variable mechanism, a sign, and the setting value on the display unit 128, and thereby, ends the spherical aberration adjustment amount displaying processing of the step S404. A display example in the step S503 will be described later with reference to FIG. 9.

Figure 6A:
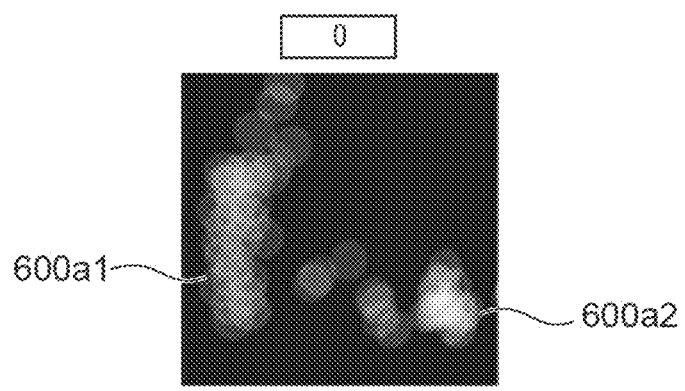
FIGS. 6A, 6B and 6C are figures that show examples of photographed images having different spherical aberration adjustment amounts.
Figure 6B:
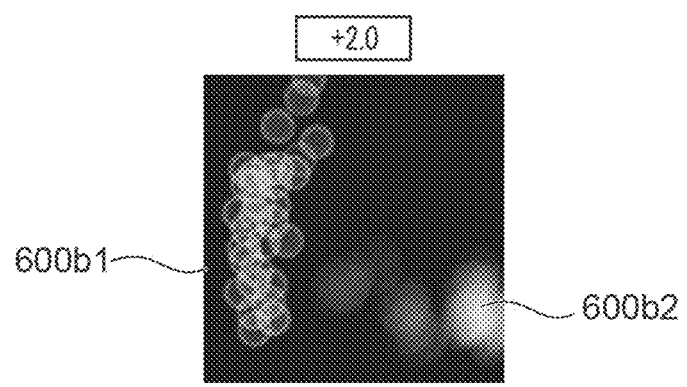
Figure 6C:
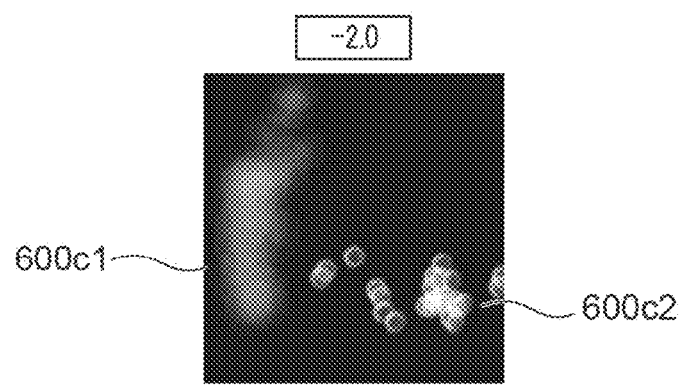

FIGS. 6A, 6B and 6C are figures that show examples of photographed images having different spherical aberration adjustment amounts. FIG. 6A shows one example of the image photographed in the case that the spherical aberration variable ring 207 is at a default position without being operated, and the spherical aberration adjustment amount of the lens barrel 200 is a default setting value, which is '0 (zero)'. Further, FIG. 6B shows one example of the image photographed in the case of setting the spherical aberration adjustment amount to '+2'. Furthermore, FIG. 6C shows one example of the image photographed in the case of setting the spherical aberration adjustment amount to '−2'. Moreover, blurring levels 600a1, 600b1, and 600c1 indicate a blurring level on a short-distance view side of the photographer, respectively, and blurring levels 600a2, 600b2, and 600c2 indicate a blurring level on a long-distance view side of the photographer, respectively.

As shown in FIG. 6A, in the case that the image capturing is performed after setting the spherical aberration adjustment amount to '0' (without changing the spherical aberration adjustment amount from the default setting value), the blurring level 600a1 on the short-distance view side of the photographer and the blurring level 600a2 on the long-distance view side of the photographer become the same (similar) blurring level.

Further, as shown in FIG. 6B, in the case that the image capturing is performed after changing the spherical aberration adjustment amount to a plus side, the blurring level 600b1 on the short-distance view side of the photographer becomes small, and a subject is photographed more clearly than the blurring level 600a1. On the other hand, the blurring level 600b2 on the long-distance view side of the photographer becomes large, and the subject is photographed more unclearly than the blurring level 600b1.

Furthermore, as shown in FIG. 6C, in the case that the image capturing is performed after changing the spherical aberration adjustment amount to a minus side, the blurring level 600c1 on the short-distance view side of the photographer becomes large, and the subject is photographed more unclearly than the blurring level 600b1. On the other hand, the blurring level 600c2 on the long-distance view side of the photographer becomes small, and the subject is photographed more clearly than the blurring level 600b1.

Although the photographer used the spherical aberration variable ring 207 with the intention that it was not moved from the default position or the spherical aberration adjustment amount was not changed, the photographer may mistakenly turn the spherical aberration variable ring 207. Further, there is also a possibility that the spherical aberration variable ring 207 has rotated without the photographer's knowledge due to the contact of the spherical aberration variable ring 207 with another object. Even in such a case, by seeing (viewing) information about the spherical aberration adjustment amount that is set by using the spherical aberration adjustment variable mechanism together with the blurred natural image that is displayed on the display unit 128 in the step S404, the photographer can notice that the spherical aberration adjustment amount has been changed and set. As a result, the photographer can recognize that the blurring level is changing due to setting the spherical aberration adjustment amount by the spherical aberration variable mechanism without taking his/her eyes off the subject in order to confirm the marker or the like that is provided on the lens barrel 200.

Further, the display control according to the flowchart of FIG. 4 described above is a processing that is mainly executed at the time of obtaining the LV image. During executing the processing of the flowchart of FIG. 5 with respect to the LV image, when the second shutter switch signal SW2 is generated by the operation of the shutter button 161 and the image capturing (image recording) is executed, a spherical aberration adjustment amount recording processing is executed. FIG. 7 is a flowchart of the spherical aberration adjustment amount recording processing. Each processing (step), which is indicated by the S number in the flowchart of FIG. 7, is realized by the system control unit 250 expanding the program, which is stored in the nonvolatile memory 256, on the system memory 252 and executing the program.

In a step S701, the system control unit 250 performs the image capturing. In a step S702, the system control unit 250 judges whether or not the lens barrel 200 is equipped with the spherical aberration variable mechanism (i.e., whether or not the image capturing is performed by the lens barrel equipped with the spherical aberration variable mechanism). In the case that the system control unit 250 judges that the lens barrel 200 is not equipped with the spherical aberration variable mechanism (NO in the step S702), the system control unit 250 ends the spherical aberration adjustment amount recording processing, and on the other hand, in the case that the system control unit 250 judges that the lens barrel 200 is equipped with the spherical aberration variable mechanism (YES in the step S702), the system control unit 250 advances the processing to a step S703. In a step S703, the system control unit 250 stores the spherical aberration adjustment amount at the time of the image capturing (at the time of the image recording) in attribute information (for example, EXIF (Exchangeable image file format) information) of the image to be recorded, and executes a recording control processing so as to associate the image with the attribute information and record it on the recording medium 295. And then, the system control unit 250 ends the spherical aberration adjustment amount recording processing.

In this way, when the photographed image is reproduced and displayed on the display unit 128, the spherical aberration adjustment amount, which is recorded in the attribute information of the image, will be displayed on the display unit 128 together with the reproduced image. Moreover, the system control unit 250 may also obtain information, which indicates a model name of the lens barrel 200 mounted on the image capturing apparatus 100 at the time of the image capturing, the presence or absence of the spherical aberration variable mechanism, etc., from the lens system control circuit 204 and record it in the attribute information.

Figure 8:
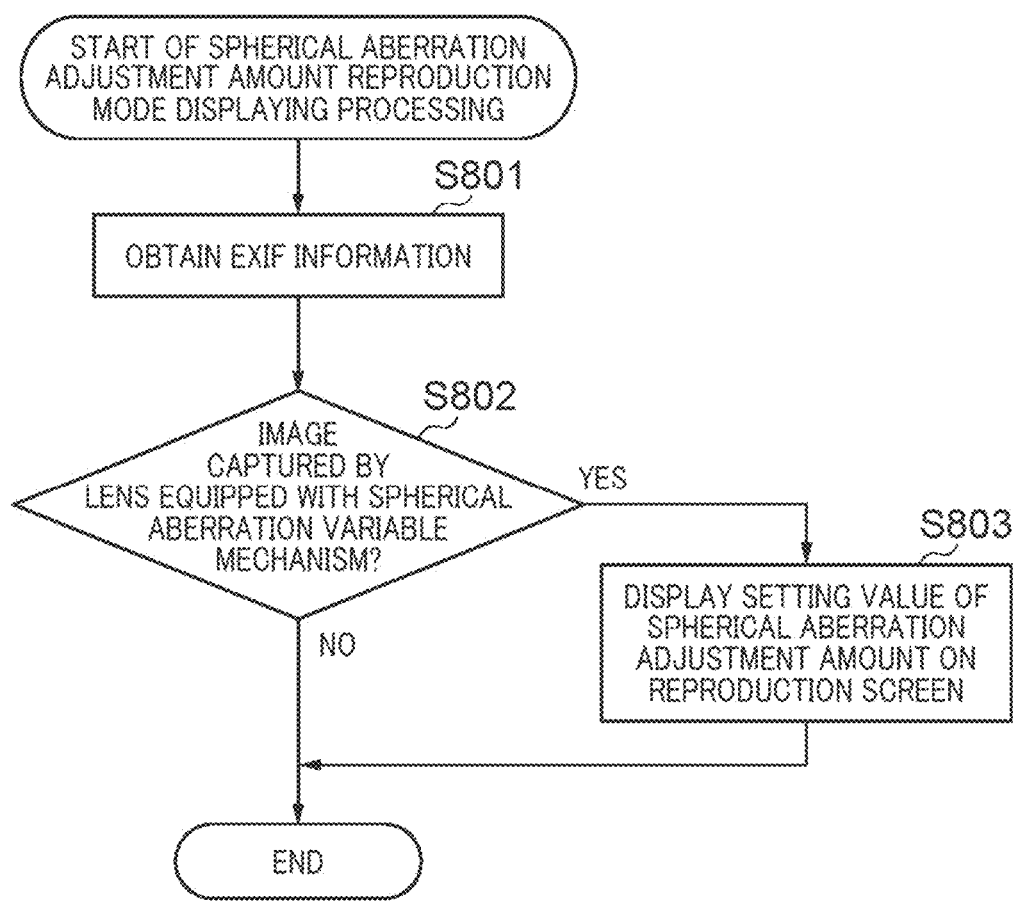
FIG. 8 is a flowchart of a spherical aberration adjustment amount displaying processing in a reproduction mode.

FIG. 8 is a flowchart of a spherical aberration adjustment amount displaying processing in the reproduction mode (hereinafter referred to as "a spherical aberration adjustment amount reproduction mode displaying processing"). Each processing (step), which is indicated by the S number in the flowchart of FIG. 8, is realized by the system control unit 250 expanding the program, which is stored in the nonvolatile memory 256, on the system memory 252 and executing the program.

In a step S801, the system control unit 250 obtains the EXIF information from the recording medium 295. In a step S802, the system control unit 250 judges on the basis of the EXIF information obtained in the step S801 whether or not to be an image captured by the lens barrel equipped with the spherical aberration variable mechanism. In the case that the system control unit 250 judges not being an image captured by the lens barrel equipped with the spherical aberration variable mechanism (NO in the step S802), the system control unit 250 ends the spherical aberration adjustment amount reproduction mode displaying processing. On the other hand, in the case that the system control unit 250 judges being an image captured by the lens barrel equipped with the spherical aberration variable mechanism (YES in the step S802), the system control unit 250 advances the processing to a step S803. In the step S803, the system control unit 250 displays the setting value of the spherical aberration adjustment amount obtained in the step S801 on (a reproduction screen) of the display unit 128, and thereby, ends the spherical aberration adjustment amount reproduction mode displaying processing.

Figure 9:
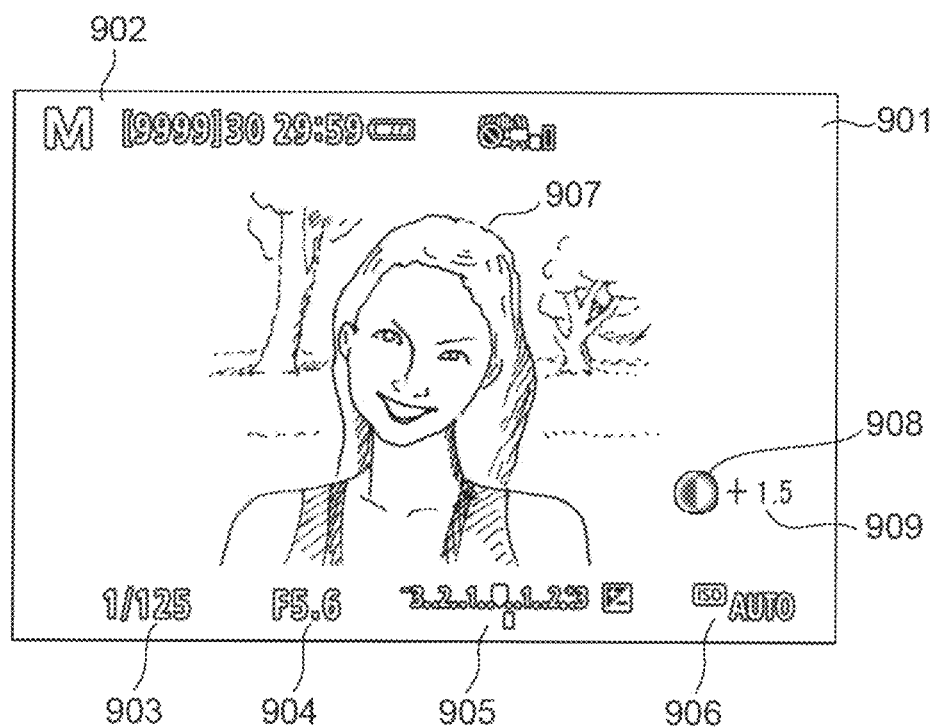
FIG. 9 is a figure that shows a display example of an LV image in the case that the lens barrel equipped with a spherical aberration variable mechanism is attached to the image capturing apparatus.

Next, a display example of the spherical aberration adjustment amount in the LV image on the display unit 128, and a display example of the spherical aberration adjustment amount in the photographed image on the display unit 128 will be described. FIG. 9 is a figure that shows the display example of the LV image in the case that the lens barrel 200 equipped with the spherical aberration variable mechanism is attached to the image capturing apparatus 100. Various kinds of icons 902 to 906, 908, and 909 are displayed on a display surface 901 (a display panel) of the display unit 128 together with the natural image (the subject image) including a subject 907.

The icon 902 represents the photographing mode, and here it is shown that a manual exposure mode is set. The icon 903 represents a setting value of the shutter speed. The icon 904 represents a setting value of an aperture value. The icon 905 represents a setting state of an exposure correction. The icon 906 represents a setting value of an ISO sensitivity.

The icon 908 is an object that schematically represents the setting value of the spherical aberration adjustment amount in the case that the lens barrel 200 is equipped with the spherical aberration variable mechanism. The icon 909 represents a sign and a value of the setting value of the spherical aberration adjustment amount. The icons 908 and 909 are displayed on the display unit 128 in the case that the lens barrel 200 equipped with the spherical aberration variable mechanism is mounted on the image capturing apparatus 100, and on the other hand, are hidden (become non-display) in the case that the lens barrel 200 is not equipped with the spherical aberration variable mechanism. Here, as the setting value of the spherical aberration adjustment amount, although '+1.5' is displayed, this is just one example, and the setting value of the spherical aberration adjustment amount at that time is displayed. Therefore, for example, it may be displayed as '0', '−4.0', or the like. Moreover, the display of the spherical aberration adjustment amount is not limited to the above-described display method of using the object, the value, and the sign, for example, the display of the spherical aberration adjustment amount may be expressed by changing a display pattern (for example, an exuding pattern) of the object that schematically shows the spherical aberration adjustment amount, or may be use only the value and the sign.

Figure 10:
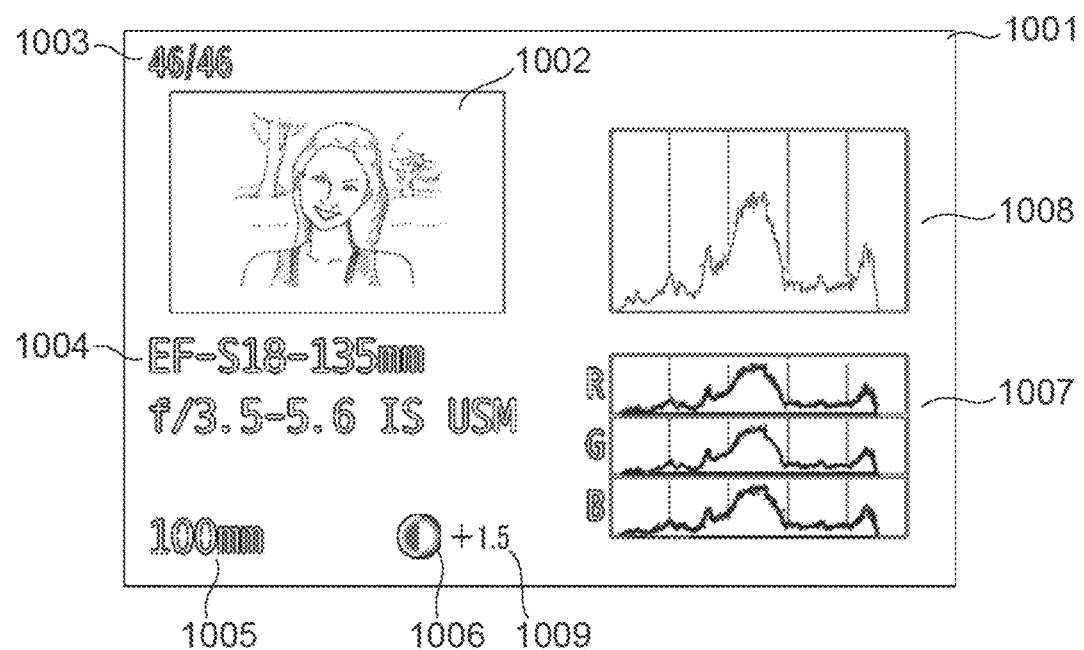
FIG. 10 is a figure that shows a display example of an image photographed by using the lens barrel equipped with the spherical aberration variable mechanism.

FIG. 10 is a figure that shows the display example of the image (the photographed image) that is photographed by using the lens barrel 200 equipped with the spherical aberration variable mechanism. First information, second information, third information, fourth information, and fifth information are displayed on a display surface 1001 (the display panel) of the display unit 128 together with a photographed image 1002, which is an image being reproduced among the photographed images recorded on the recording medium 295.

The first information is image number information 1003, and indicates the total number of images recorded on the recording medium 295 and image number of the photographed image 1002 currently displayed. The second information is lens name information 1004, and represents the name of the lens barrel used at the time of the image capturing of the photographed image 1002. Here, the lens name information 1004 is defined by variable ranges of a focal length and the aperture value, but is not limited thereto.

The third information is focal length information 1005 of the lens barrel, and represents the focal length at the time of photographing of the photographed image 1002. The fourth information is spherical aberration information 1006 and 1009, the spherical aberration information 1006 represents an object indicating that the spherical aberration has been adjusted at the time of photographing of the photographed image 1002, and the spherical aberration information 1009 represents a value and a sign of the spherical aberration adjustment amount. In the case that the lens barrel used at the time of photographing of the photographed image 1002 is equipped with the spherical aberration variable mechanism, the spherical aberration information 1006 and 1009 will be displayed on the display surface 1001, and on the other hand, in the case that the lens barrel used at the time of photographing of the photographed image 1002 is not equipped with the spherical aberration variable mechanism, the spherical aberration information 1006 and 1009 will be hidden (will become non-display). Moreover, the spherical aberration information 1006 and the spherical aberration information 1009 are the same as the icon 908 and the icon 909 in the LV image displayed on the display unit 128 at the time of the image capturing of the photographed image 1002, respectively. This makes it possible for the photographer to easily grasp the spherical aberration adjustment amount not only at the time of the image capturing and but also at the time of reproduction. The fifth information is histograms 1007 and 1008 of the photographed image 1002.

As described above, in the present invention, in the case that the lens barrel equipped with the spherical aberration variable mechanism is mounted on the image capturing apparatus, at the time of the image capturing, information about the spherical aberration adjustment amount set by using the spherical aberration variable mechanism will be displayed on the display unit of the image capturing apparatus. Thereby, through the LV image displayed on the display unit, the photographer can easily recognize whether or not the blurring level of the image at the time of the image capturing is due to the spherical aberration variable mechanism mounted on the lens barrel. Further, in the present invention, the information about the spherical aberration adjustment amount is stored in image data of the photographed images that are photographed by using the lens barrel equipped with the spherical aberration variable mechanism. Thereby, when the photographed image is reproduced and displayed, the photographer can easily recognize whether or not to be an image photographed by setting the spherical aberration adjustment amount, and the spherical aberration adjustment amount.

It should be noted that the various controls described as those performed by the system control unit 250 in the above embodiment may be performed by one hardware, or may be realized by a plurality of hardware (for example, a plurality of processors and/or circuits) sharing the processing load.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

The invention claimed is:

1. An image capturing apparatus, to/from which a lens barrel can be attached/detached, comprising:
   a mounting unit configured to mount the lens barrel;
   a processor; and
   a memory storing a program which, when executed by the processor, causes the image capturing apparatus to:
   receive lens information about the lens barrel, which is attached to the mounting unit, from the lens barrel;
   detect presence or absence of a rotation operation, a rotation direction, and a rotation amount of a spherical aberration variable mechanism, when the lens information indicates that the lens barrel is equipped with the spherical aberration variable mechanism;
   obtain an adjustment amount of spherical aberration from the lens barrel mounted on the mounting unit; and
   control a display device to display information about the adjustment amount together with an image obtained through the lens barrel.

2. The image capturing apparatus according to claim 1, wherein, when the lens information indicates that the lens barrel mounted on the mounting unit is equipped with a spherical aberration variable mechanism, the information is displayed on the display device even if the adjustment amount by the spherical aberration variable mechanism is zero.

3. The image capturing apparatus according to claim 1, wherein, when the lens information indicates the lens barrel mounted on the mounting unit is not equipped with a spherical aberration variable mechanism so that the adjustment amount is not obtained, the information is not displayed on the display device.

4. The image capturing apparatus according to claim 1, wherein the program, when executed by the processor, further causes the image capturing apparatus to:
   control so as to associate the image with the adjustment amount and then record it on a recording medium.

5. The image capturing apparatus according to claim 1, wherein, when the lens barrel mounted on the mounting unit is equipped with the spherical aberration variable mechanism, the information about the adjustment amount is displayed as an icon, and a blurring level of the image based on the adjustment amount by a spherical aberration variable mechanism is represented by changing a display pattern of the icon.

6. The image capturing apparatus according to claim 5, wherein the program, when executed by the processor, further causes the image capturing apparatus to control so as to display a sign and a value of the adjustment amount set by the spherical aberration variable mechanism together with the icon.

7. The image capturing apparatus according to claim 1, further comprising:
an image capturing unit configured to convert an optical image, which is formed by the lens barrel mounted on the mounting unit, into image signals, and
wherein the image is a live view image obtained by the image capturing unit.

8. A control method for an image capturing apparatus, to/from which a lens barrel can be attached/detached, that comprises a mounting unit configured to mount the lens barrel, the control method comprising:
a step of receiving lens information about the lens barrel, which is attached to the mounting unit, from the lens barrel;
a step of detecting presence or absence of a rotation operation, a rotation direction, and a rotation amount of a spherical aberration variable mechanism, when the lens information indicates that the lens barrel is equipped with the spherical aberration variable mechanism
a step of obtaining an adjustment amount of spherical aberration from the lens barrel mounted on the mounting unit; and
a step of controlling a display device to display information about the adjustment amount together with an image obtained through the lens barrel.

9. A non-transitory computer-readable storage medium storing a program for causing a computer to execute a control method according to claim 8.

10. An image capturing apparatus, to/from which a lens barrel can be attached/detached, comprising:
a mounting unit configured to mount the lens barrel;
a processor; and
a memory storing a program which, when executed by the processor, causes the image capturing apparatus to:
obtain an adjustment amount of spherical aberration from the lens barrel mounted on the mounting unit;
control a display device to display information about the adjustment amount together with an image obtained through the lens barrel;
control so as to associate the image with the adjustment amount and then record it on a recording medium; and
control so that when the image recorded on the recording medium is reproduced and displayed on the display device, information, which corresponds to the adjustment amount associated with the image, is superimposed on the image and displayed.

11. A control method for an image capturing apparatus, to/from which a lens barrel can be attached/detached, that comprises a mounting unit configured to mount the lens barrel,
the control method comprising:
obtaining an adjustment amount of spherical aberration from the lens barrel mounted on the mounting unit;
controlling a display device to display information about the adjustment amount together with an image obtained through the lens barrel;
controlling so as to associate the image with the adjustment amount and then record it on a recording medium; and
controlling so that when the image recorded on the recording medium is reproduced and displayed on the display device, information, which corresponds to the adjustment amount associated with the image, is superimposed on the image and displayed.

12. A non-transitory computer-readable storage medium storing a program for causing a computer to execute a control method of an image capturing apparatus, to/from which a lens barrel can be attached/detached, that comprises a mounting unit configured to mount the lens barrel,
the control method comprising:
obtaining an adjustment amount of spherical aberration from the lens barrel mounted on the mounting unit;
controlling a display device to display information about the adjustment amount together with an image obtained through the lens barrel;
controlling so as to associate the image with the adjustment amount and then record it on a recording medium; and
controlling so that when the image recorded on the recording medium is reproduced and displayed on the display device, information, which corresponds to the adjustment amount associated with the image, is superimposed on the image and displayed.

* * * * *